US012383914B2

(12) United States Patent
Patil et al.

(10) Patent No.: US 12,383,914 B2
(45) Date of Patent: Aug. 12, 2025

(54) VOLTAGE ASSISTED PAINTING SYSTEM

(71) Applicant: NISSAN NORTH AMERICA, INC., Franklin, TN (US)

(72) Inventors: Sandeep Patil, Farmington Hills, MI (US); Cenk Gumeci, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 65 days.

(21) Appl. No.: 17/710,907

(22) Filed: Mar. 31, 2022

(65) Prior Publication Data

US 2023/0311139 A1 Oct. 5, 2023

(51) Int. Cl.
*B05B 5/08* (2006.01)
*B05B 5/03* (2006.01)
*B05B 5/053* (2006.01)

(52) U.S. Cl.
CPC ............ *B05B 5/087* (2013.01); *B05B 5/0533* (2013.01); *B05B 5/03* (2013.01)

(58) Field of Classification Search
CPC .......... B05D 5/00; B05D 3/12; B06B 1/0292; B05B 12/082; B05B 12/18; B05B 7/0012; B05B 7/0884; B05B 17/0607; B05B 5/087; B05B 5/0533; B05B 5/03
See application file for complete search history.

(56) References Cited

U.S. PATENT DOCUMENTS

2006/0210909 A1* 9/2006 Ohtani ........................ B01J 2/04 430/105
2008/0286679 A1* 11/2008 Norikane .................. B29B 9/10 430/105

OTHER PUBLICATIONS

Corvus Disinfecting Programs: Electrostatic Spraying, https://corvusjanitorial.com/corvus-disinfecting-programs-electrostaticspraying/#:~:text=Electrostatic%20spraying%20is%20a%20method,1930s%20t0%20improve%20spray%20disposition, viewed Mar. 2022.
U.S. Appl. No. 17/129,622; Acoustic Force Assisted Painting System; S Patil et al.; filed Dec. 21, 2020.

* cited by examiner

*Primary Examiner* — Christopher R Dandridge
(74) *Attorney, Agent, or Firm* — Global IP Counselors, LLP

(57) ABSTRACT

A voltage assisted painting system includes a housing, at least one nozzle, and at least one electrode. The housing has a conduit for receiving paint from an external source into the housing. The at least one nozzle is disposed in the housing. The at least one nozzle has an inlet that is fluidly connected to the conduit to receive paint from the conduit. The at least one nozzle has an outlet that dispenses paint. The at least one electrode is provided at the housing at a location downstream of the inlet with respect to the conduit. The at least one electrode is configured to generate a magnetic field in the vicinity of the outlet.

18 Claims, 14 Drawing Sheets

VOLTAGE ASSISTED PAINTING SYSTEM

BACKGROUND

Field of the Invention

The present invention generally relates to a voltage assisted painting system. More specifically, the present invention relates to a voltage assisted painting system for applying paint to a vehicle body.

Background Information

Vehicle paints are typically applied using rotary atomizers that include a rotating bell cup having a generally conical overflow surface that opens to an atomizing edge. The paint that is dispensed from rotary atomizers tends to be tortuous and non-uniform as the atomizing process results in a turbulent path of the paint droplets. Conventional rotary bell atomizers cannot handle high low-shear viscosity paint fluid. Thus, current commercial paint has to contain about 50% of solvent which requires drying through a baking process. Additionally, the atomizing process tends to result in waste and it is difficult to utilize for customizations and application of multi-tone paint.

SUMMARY

In view of the state of the known technology, one aspect of the present disclosure is to provide a voltage assisted painting system comprising a housing, at least one nozzle, and at least one electrode. The housing has a conduit for receiving paint from an external source into the housing. The at least one nozzle is disposed in the housing. The at least one nozzle has an inlet that is fluidly connected to the conduit to receive paint from the conduit. The at least one nozzle has an outlet that dispenses paint. The at least one electrode is provided at the housing at a location downstream of the inlet with respect to the conduit. The at least one electrode is configured to generate a magnetic field in the vicinity of the outlet.

Also other objects, features, aspects and advantages of the disclosed voltage assisted painting system will become apparent to those skilled in the art from the following detailed description, which, taken in conjunction with the annexed drawings, discloses one embodiment of the voltage assisted painting system.

BRIEF DESCRIPTION OF THE DRAWINGS

Referring now to the attached drawings which form a part of this original disclosure.

DETAILED DESCRIPTION OF EMBODIMENTS

Figure 1:
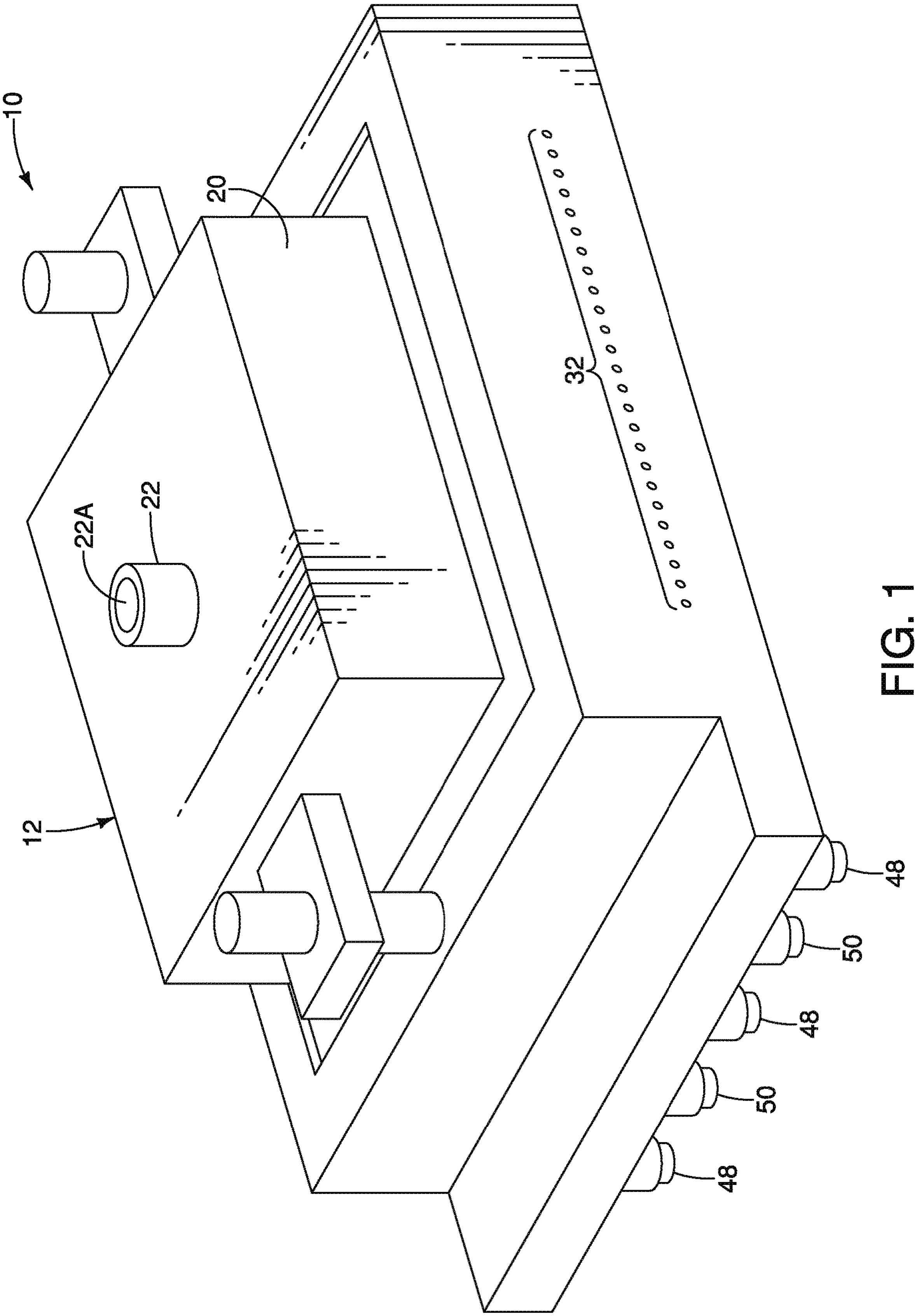
FIG. 1 is a perspective view of a housing for a voltage assisted painting system in accordance with an illustrated embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 5, an voltage assisted painting system 10 is illustrated in accordance with an embodiment. The voltage assisted painting system 10 of the illustrated embodiment can be utilized for applying paint to various types of substrate such as a vehicle body (not shown). The voltage assisted painting system 10 comprises a housing 12, at least one nozzle 14 and at least one electrode 16. The electrodes 16 of the illustrated embodiment can be one or more solid electric conductors that is capable of carrying out an electric current or an electric field to the contents of the nozzles 14. The electrodes 16 are preferably made of good electric conducting materials, such as copper.

In the illustrated embodiment, the housing 12 houses a plurality of nozzles 14 and a plurality of electrodes 16. As will be described, in the illustrated embodiment, the electrodes 16 can be provided as part of the nozzles 14 or can be provided exterior to the nozzles 14. In the illustrated embodiment, the voltage assisted painting system 10 is illustrated as a multi-nozzle painting system. However, it will be apparent to those skilled in the vehicle field from this disclosure that the voltage assisted painting system 10 can be utilized as a single-nozzle painting system with one or more electrodes provided for the single nozzle.

Figure 2:
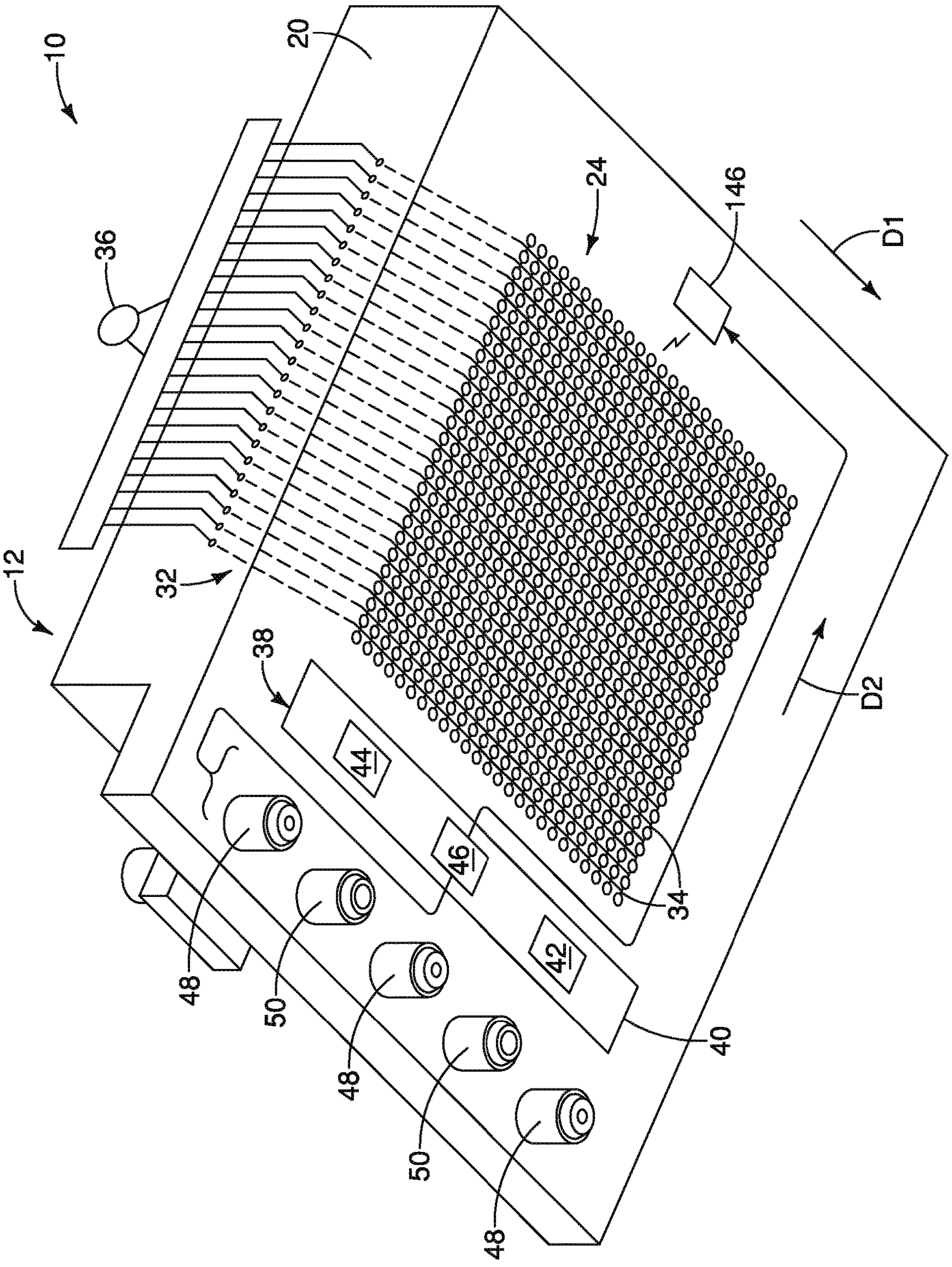
FIG. 2 is a perspective view of an underside of the housing of FIG. 1.
Figure 3:
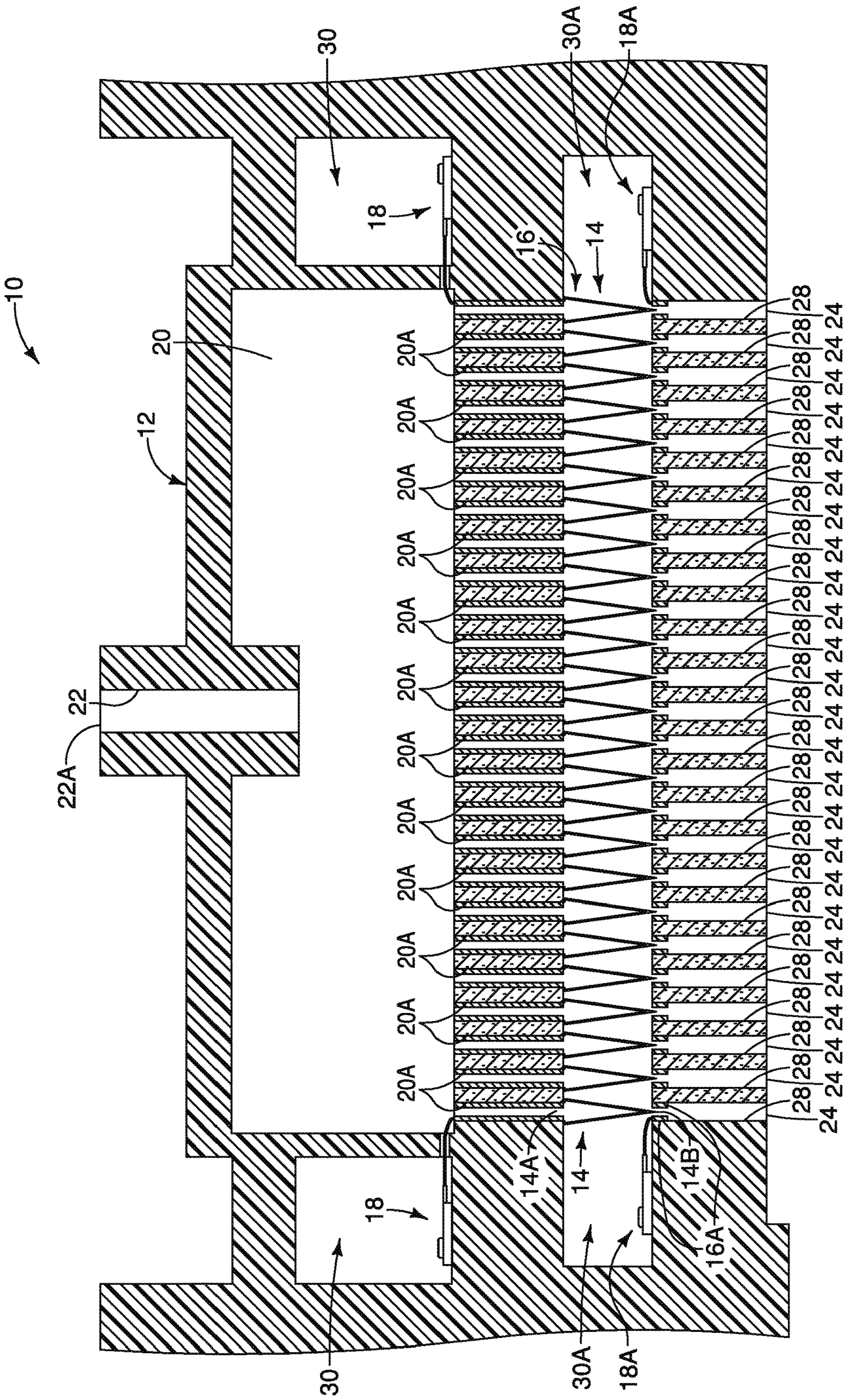
FIG. 3 is a cross-sectional view of the housing of FIGS. 1 and 2.
Figure 4:
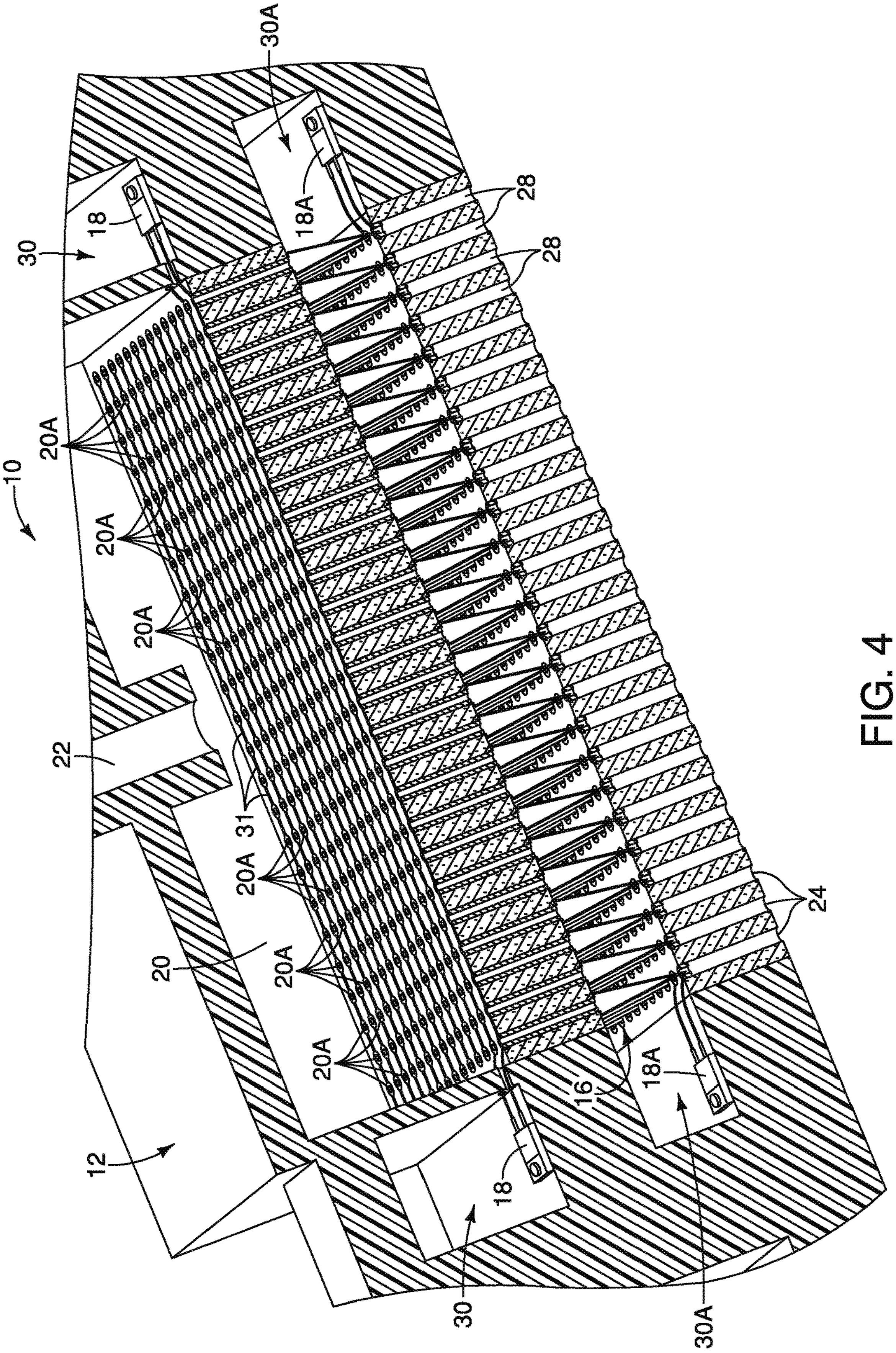
FIG. 4 is another cross-sectional view of the housing of FIGS. 1 to 3.

As best seen in FIGS. 3 and 4, the voltage assisted painting system 10 includes one or more voltage regulator 18 that is housed in the housing 12. As shown, the housing 12 includes a plurality of voltage regulators 18. In other words, the voltage assisted painting system 10 of FIGS. 1 to 5 includes the plurality of nozzles 14 and can include one or more plurality of voltage regulators 18 each supplying electric current to the electrodes 18. The voltage assisted painting system 10 is provided for paint application to a vehicle body using assistance from the voltage regulators 18 and the electrodes 16.

In the illustrated embodiment, the term "paint" will refer to any material including, but not limited to, one or more of the following substances: traditional paint, ink, polymers, water, solvents, and other fluids imparting color to a substrate and mixtures of the above-mentioned substances.

"Paint" can also refer to material(s) having viscosities significantly higher and significantly lower than traditional paint viscosities.

The voltage assisted painting system 10 of the illustrated embodiment uses electric ionization to induce droplet formation formed at the nozzles 14. In particular, the voltage assisted painting system 10 utilizes the electrodes 16 to produce electromagnetic or electric fields near or at the nozzles 14 to induce a continuous droplet formation process from the nozzles 14. Thus, the voltage regulators 18 of the voltage assisted painting system 10 are electrically connected to each of the plurality of nozzles 14 to regulate electric current to the electrodes 16. As stated, the voltage assisted painting system 10 can comprise one or more voltage regulators 18 that are connected to the nozzles 14 to deliver and regulate electric current to the electrodes 16. The voltage regulators 18 are illustrated as being connected to some of the nozzles 14 schematically for simplicity.

As the voltage regulators 18 are identical, only one of the voltage regulators 18 will be further described herein. The voltage regulator 18 can include a circuit that creates and maintains a fixed output voltage. The voltage regulator 18 is connected to a power supply (not shown) that can be internally provided to the housing 12 or can be external to the housing 12. The applied voltage from the voltage regulator 18 can produce an electric field at or near the nozzles 14 to fine tune the size or diameter of the droplets that are formed at the nozzles 14. The application of voltage from the voltage regulator 18 can also help discharge the droplets that are formed at the tips of the nozzles 14 to facilitate a continuous droplet deposition onto the substrate.

In particular, the application of voltage creates an electric field generated from the electrodes 16. The electric field can form a continuous stream of droplets having diameters that are much smaller than typical droplets formed without electrostatic assistance, such that the paint droplets formed by the voltage assisted painting system 10 has a lower viscosity and can be a continuous stream that can be sprayed onto a substrate. Therefore, in the illustrated embodiment, the application of a high voltage electric field from the electrodes 16 helps eject the droplets from the nozzles 14 to form charged droplets.

The voltage assisted painting system 10 further utilizes a series of air flow channels to apply gas to the droplets at the nozzles 14. Therefore, the voltage assisted painting system 10 utilizes a combination of electric field application and air flow application to facilitate droplet formation, as will be further described below. In the illustrated embodiment, the voltage assisted painting system 10 can increase the voltage application to the electrodes 16 to increase the intensity of the electric field(s) created by the electrodes 16. By doing so, the size of the droplets formed at the nozzles 14 can decrease. Increasing the voltage application can also increase the frequency of droplet formation at the nozzles 14.

The voltage assisted painting system 10 preferably applies argon (Ar), helium (He) or nitrogen ($N_2$) gas to the droplets that are formed at the nozzles 14 to help pull or discharge the droplets from the nozzles 14 by providing further momentum to the droplets, as will be further described below. Preferably, the application of air from the air flow channels also helps spray the formed droplets such that the housing 12 can act as a spray chamber.

Conventional vehicle paint has high viscosity that result in the formation of large-sized paint droplets during application of the paint to the vehicle body. Therefore, the voltage assisted painting system 10 of the illustrated embodiment is provided for forming and dispensing uniformly-sized paint droplets from the housing 12 to the vehicle body. The voltage assisted painting system 10 is provided to apply continuous pressure of the paint droplets that are dispensed from the housing 12.

Referring to FIGS. 3 and 4, the housing 12 includes a reservoir 20 for storing paint. The housing 12 includes a conduit 22 that fluidly receives paint from an external source (not shown) to be stored in the reservoir 20. The conduit 22 fluidly connects the reservoir 20 with the external source to receive paint into the housing 12. The conduit 22 includes an opening that defines an inlet 22A that can be considered an inlet 22A for the housing 12. While the housing 12 is illustrated as being provided the reservoir 20 therein, it will be apparent to those skilled in the vehicle field from this disclosure that the housing 12 can be modified such that the conduit 22 connects directly to the nozzles 14. That is, it will be apparent to those skilled in the vehicle field from this disclosure that the housing 12 does not need to include the reservoir 20. Rather, a reservoir can be provided separately from the housing 12 to deliver paint into the housing 12. Therefore, it will be apparent to those skilled in the vehicle field from this disclosure that the voltage assisted painting system 10 can include a reservoir that is separately provided from the housing 12.

As seen in FIG. 2, the housing 12 includes a plurality of outlets 24 positioned at an underside surface that is opposite side on the housing 12 with respect to the conduit 22. The paint is dispensed from the outlets 24 to be applied to the vehicle body. In the illustrated embodiment, each of the outlets 24 of the housing 12 correspond to one of the nozzles 14. That is, the outlets 24 of the housing 12 receive paint from the nozzles 14 to dispense, as will be further described. While the housing 12 is illustrated as including a single conduit 22 it will be apparent to those skilled in the vehicle field from this disclosure that the housing 12 can include a plurality of conduits 22 for receiving different colors and/or types of paint. Additionally, while the housing 12 is illustrated as including a single reservoir 20 that is fluidly connected to all of the nozzles 14, it will be apparent to those skilled in the vehicle field from this disclosure that the housing 12 can include a plurality of reservoirs 20 for storing different colors and/or types of paint.

As best seen in FIGS. 3 and 4, the reservoir 20 is a space that receives paint from the conduit 22. The reservoir 20 is preferably is small feedstock reservoir that does not carry significant weight to the housing 12. Thus, the reservoir 20 is configured to continuously receive paint from the conduit 22 during use of the voltage assisted painting system 10. The reservoir 20 includes a plurality openings 20A that extend into the nozzles 14. The housing 12 can further includes a plurality of channels 28 that receive paint from the nozzles 14. The channels 28 include the outlets 24 of the housing 12 that open to the exterior. Therefore, the channels 28 are fluidly connected to the nozzles 14 to receive paint from the reservoir 20.

Figure 5:
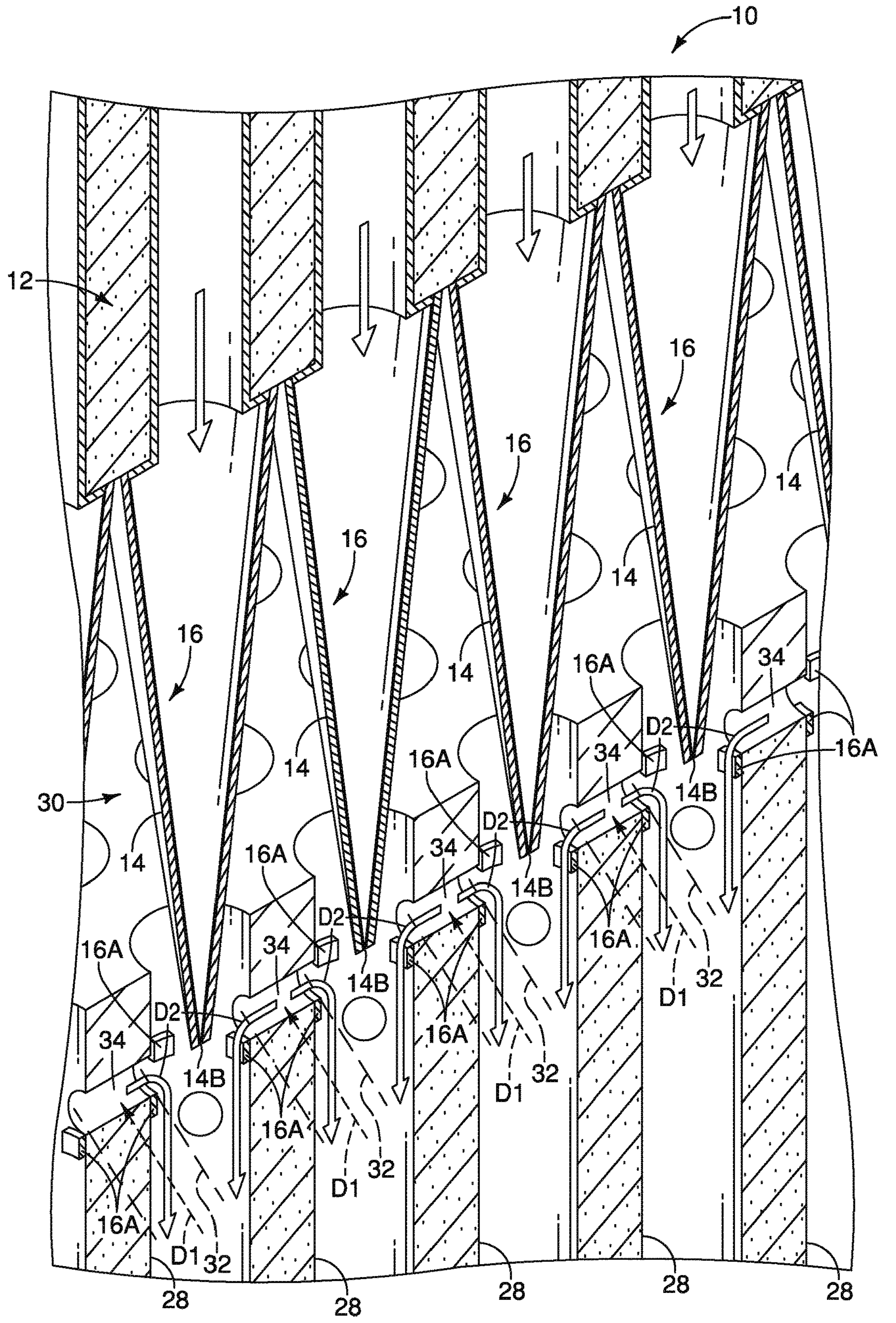
FIG. 5 is an enlarged cross-sectional view of a portion of the housing of FIGS. 1 to 4.

Thus, the nozzles 14 are fluidly connected to the reservoir 20 and the outlets 24 of the housing 12. That is, the nozzles 14 fluidly connect the reservoir 20 with the outlets 24 of the housing 12 to dispense the paint. As seen in FIGS. 3 to 5, each of the nozzles 14 has an inlet 14A and an outlet 14B. The inlets 14A of the nozzles 14 are fluidly connected to the conduit 22 to receive paint. Each of the outlets 14B of the nozzles 14 dispenses paint into respective ones of the channels 28 that lead to the outlets 24 of the housing 12. Therefore, each of the nozzles 14 has an outlet 14B that dispenses paint. It will be apparent to those skilled in the vehicle field from this disclosure that the housing 12 can be reconfigured without the channels 28. Therefore, the outlets 14B of the nozzles 14 can alternatively extend directly to the exterior of the housing 12.

As shown in FIGS. 3 to 5, the nozzles 14 are shaped as tubes having a consistent volume along the longitudinal lengths of the nozzles 14. The nozzles 14 preferably taper towards the outlets 14B so to decrease the volume of the nozzles 14 near the outlets 14B to the formation of small droplets at the nozzles 14 and increase the frequency of droplet formation.

It will be apparent to those skilled in the vehicle field from this disclosure that the sizes of the nozzles 14 can vary depending on the intensity of the voltage that is applied to the droplets from the voltage regulators 18. Therefore, the sizes of the nozzles 14 can vary depending the intensity of the voltage that is emitted by the voltage regulators 18. Therefore, it will be apparent to those skilled in the vehicle field from this disclosure that the outlets 14B of the nozzles 14 can be larger when the voltage regulators 18 emit a higher voltage.

As stated, the nozzles 14 are made of any conducting material capable of conducting electricity, such as copper. Preferably, the nozzles 14 are metallic bodies or tubes. Each metallic body has the at least one electrode 16. In the illustrated embodiment, the nozzles 14 can define the electrodes 16 of the voltage assisted painting system 10. Alternatively speaking, each of the electrodes 16 of the voltage assisted painting system 10 is provided at each of the nozzles 14. In the illustrated embodiment, the housing 12 is preferably made of an electric insulating material such as ceramic. In the illustrated embodiment, the nozzles 14 can be considered the electrodes 16 that generate electric fields upon receiving voltage application, as will be further discussed below. The at least one electrode 16 is formed as part of the metallic body of the nozzles 14.

The voltage assisted painting system 10 further includes one or more additional electrodes 16A that are provided offset of the nozzles 14. Therefore, the voltage assisted painting system 10 includes electrodes 16 that are the nozzles 14, and additional electrodes 16A that can work in conjunction with the nozzles 14 to provide an electric field to the droplets. In particular, the additional electrodes 16A are preferably provided near the outlets 14B of the nozzles 14. Therefore, in the embodiment illustrated in FIGS. 3 to 5, the voltage assisted painting system 10 includes electrodes 16 that includes the nozzles 14 or are portions of the nozzles 14, and also includes the additional electrodes 16A that are exterior of the nozzles 14.

As best seen in FIGS. 3 to 5, the additional electrodes 16A are provided at the housing 12 at a location downstream of the inlet 22A with respect to the conduit 22. The electrode 16 is configured to generate a magnetic field at the vicinity of the outlet 14B. Therefore, the additional electrodes 16A are provided adjacent to the outlets 14B. The additional electrodes 16A are arranged in a symmetrical array around each of the outlets 14B. While only three additional electrodes 16A are shown, the illustrated embodiment includes four additional electrodes 16A provided as an array around the outlets 14B. It will also be apparent to those skilled in the vehicle field from this disclosure that the additional electrodes 16A can include further electrodes 16B (such as six or eight electrodes 16B) arranged in a symmetrical array around the outlets 14B as needed and/or necessary.

Therefore, in the embodiment of FIGS. 3 to 5, the voltage regulators 18 can apply voltage either to the bodies of the nozzles 14 or just to the additional electrodes 16A at the outlets 14B. The housing 12 further includes a chamber 30 that houses the voltage regulators 18. In other words, the voltage regulators 18 are disposed in the chamber 30. The chamber 30 is positioned between the reservoir 20 and the channels 28. Therefore, the voltage regulators 18 are positioned between the reservoir 20 and the channels 28. The nozzles 14 extend through the chamber 30 and are primarily disposed in the chamber 30 but extend partially in the channels 28. In particular, the outlets 14B of the nozzles 14 are disposed in the channels 28.

Preferably, the housing 12 further includes an additional chamber 30A that houses additional voltage regulators 18A. The additional chamber 30A is downstream of the chamber 30 such that the additional voltage regulators 18A are downstream of the voltage regulators 18. The additional chamber 30As are positioned near the inlets of the channels 28. In the illustrated embodiment, the voltage regulators 18 deliver electric voltage to the nozzles 14 which act as the electrodes 16. The additional voltage regulators 18A deliver electric voltage to the additional electrodes 16A. It will be apparent to those skilled in the vehicle field from this disclosure that the arrangement and the positioning of the chambers 30 and 30A and the voltage regulators 18 and 18A within the housing 12 can vary depending on the arrangement of the nozzles 14 and the electrodes 16 and 16A. Therefore, the housing 12 being depicted as having a pair of chambers 30 and a pair of additional chambers 30A disposed on either side of the housing 12 are illustrated as an example only.

In the illustrated embodiment, a direction of paint flow flows from the conduit 22, to the reservoir 20, to the nozzles 14, to the channels 28, to the outlets 24. That is, the reservoir 20 is upstream of the nozzles 14 and the nozzles 14 are upstream of the outlets 24. In the illustrated embodiment, the chamber(s) 30 that houses the voltage regulator(s) 18 are disposed downstream of the reservoir 20 and upstream of the outlets 24 of the housing 12. As best seen in FIGS. 3 and 4, the chamber 30 is upstream of the outlets 14B of the nozzles 14. That is, the voltage regulators 18 are preferably upstream of the outlets 14B of the nozzles 14.

As best seen in FIG. 4, each of the plurality of nozzles 14 of the illustrated embodiment are in electric communication with each other. In particular, the nozzles 14 are electrically connected together via electrical conductors 31 such as metallic bars or strips. The nozzles 14 can be electrically connected at the inlets 14A of the nozzles 14. The voltage regulators 18 are electrically connected to one of the nozzles 14 so that the electrical charge or voltage provided to the nozzle 14 can be transmitted through all of the nozzles 14 via the electrical conductors 31. The voltage regulators 18 can be connected to the nozzle 14 via one or more electrical wires.

Similarly, the additional voltage regulators 18A can be electrically connected to an array of additional electrodes 16A to provide voltage to the additional electrodes 16A. It will be apparent to those skilled in the vehicle field from this disclosure that the number and arrangement of voltage regulators 18 that can be implemented with the housing 12 can vary. It will also be apparent to those skilled in the vehicle field from this disclosure that the positions of the voltage regulators 18 within the chamber 30 can vary. Therefore, the illustration of the electrical connection between the voltage regulators 18 and 18A with the nozzles 14 and the additional electrodes 16A are illustrated as an example only.

As best seen in FIGS. 1, 2 and 5, the housing 12 includes a first airflow channel 32 and a second airflow channel 34.

The first airflow channel 32 extends through the channels 28 in a first direction D1 to enable external air to flow through the channels 28 in the first direction D1, as best seen in FIG. 2. As best seen in FIG. 5, the second airflow channel 34 extends through the channels 28 in a second direction D2 that is transverse to the first direction D1 to enable external air to flow in the second direction D2 The first and second airflow channels 32 and 34 are arranged and configured to generate air flow forces to help detach the droplets from the outlets 14B of the nozzles 14. In particular, air flow forces can be directed towards the droplets. Alternatively, as best seen in FIG. 5, air flow can enter the channels 28 tangentially from the first airflow channel 32 to create a swirling moment at the droplets that have been detached from the outlets 14B.

The first airflow channel 32 opens to the exterior of the housing 12, as shown in FIGS. 1 and 2. As best seen in FIG. 2, the voltage assisted painting system 10 further includes an external airflow source, such as an air pump 36. The air pump 36 is in direct communication with the first airflow channel 32 to pump air from the exterior of the housing 12 into the first airflow channel 32. As shown in FIGS. 2 and 5, the first and second airflow channels 32 and 34 are in communication with each other such that air flows from the first airflow channel 32 to the second airflow channel 34.

The second airflow channels 34 intersect with the channels 28 of the housing 12 to enable airflow from the second airflow channels 34 to the channels 28. In particular, as best seen in FIG. 5, the second airflow channels 34 intersect with the channels 28 at a location in the vicinity of the outlets 14B of the nozzles 14 so that air from the second airflow channels 34 is applied to the droplets dispensed from the outlets 14B of the nozzles 14.

In the illustrated embodiment, air flow forces flow from the air pump 36, to the first airflow channels 32, to the second airflow channels 34, to the channels 28. In this way, air is pumped from the exterior to the channels 28 to apply airflow forces that will help push the droplets that have been detached from the outlets 14B downward into the channels 28. Therefore, the air flows through the first and second airflow channels 32 and 34 to apply airflow force to the nozzles 14.

Referring to FIG. 4, the nozzles 14 are arranged in an array of successive rows and columns within the housing 12. Each of the nozzles 14 preferably has the same size and dimension with respect to each other to ensure uniformity of the droplets that are formed. The inlets 14A of the nozzles 14 are preferably approximately 250 micros (μm) in diameter. The droplets formed at the outlets 14B of the nozzles 14 preferably has a size between 50 μm to 100 μm.

As stated, the additional electrodes 16A are provided to increase the intensity of the electric field around the outlets 14B where the droplets are formed. The additional electrodes 16A are capable of being charged to generate electric fields as a series of arrays around the outlets 14B. Referring to FIGS. 2 to 4, the voltage assisted painting system 10 of the illustrated embodiment can include a control system 38 programmed to control the components of the housing 12, such as the nozzles 14 and the voltage regulators 18 and 18A. The control system 38 can include an electronic controller 40 for controlling the nozzles 14 and voltage regulators 18, either in combination or selectively as will be described below. The electronic controller 40 is preferably a microcomputer that includes one or more processor(s) 42 and one or computer memory device(s) 44.

The electronic controller 40 can control the voltage regulators 18 to apply voltage to the nozzles 14 as the paint is traveling down the bodies of the nozzles 14. The electronic controller 40 can also control the additional voltage regulators 18A to apply voltage to the additional electrodes 16A once droplets begin forming at the outlets 14B. The electronic controller 40 can control the additional voltage regulators 18A to apply voltage to all the additional electrodes 16A in the array in conjunction.

Alternatively, the electronic controller 40 can control the additional voltage regulators 18A to apply voltage to the additional electrodes 16A in sequence or one at a time. The sequential control of the additional electrodes 16A one at a time sequentially can create a series of electric fields around the outlets 14B to generate rotation of the droplets from the outlets 14B. The electronic controller 40 can also control the voltage regulators 18 and 18A to adjust the voltage level that is applied to the nozzles 14 and/or the electrodes 16 and 16A. The electronic controller 40 can control the voltage regulators 18 and the additional voltage regulators 18A in order to stagger the velocity (e.g., the stop and start flow) of the discharge of droplets from the nozzles 14, or provide a constant velocity of droplet discharge from the nozzles 14.

The control system 38 can include memory 44 such as any computer storage device or any computer readable medium with the sole exception of a transitory, propagating signal. For example, the memory 44 can be nonvolatile memory and volatile memory, and can includes a ROM (Read Only Memory) device, a RAM (Random Access Memory) device, a hard disk, a flash drive, etc. The storage device can be any a non-transitory computer readable medium such as a ROM (Read Only Memory) device, a RAM device, a hard disk, a flash drive, etc. The memory 44 is configured to store settings, programs, data, calculations and/or results of the processor 42(*s*).

The electronic controller 40 can be programmed to control the sequence, frequency and/or the voltage level emitted by the voltage regulators 18 and 18A. For example, the electronic controller 40 can be programmed to modulate the electrodes 16 and 16A to change the oscillation (e.g. frequency, phase and/or amplitude) of the voltage emitted by the voltage regulators 18 and 18A. The electronic controller 40 can control the oscillation of the electrodes 18A to modulate voltage upon detection that droplets have formed at the outlets 14B of the nozzles 14 and/or that the droplets have been formed are at a predetermined size.

In view of this, the housing 12 can include one or more detector(s) (not shown) disposed at the nozzles 14 or in the vicinity of the nozzles 14 to detect the presence and size of droplets forming at the outlets 14B of the nozzles 14. The detectors can be any type of sensor as needed and/or appropriate. For example, the detector(s) can utilize thermal imaging or acoustic imaging to measure a size or profile of the droplets. The detectors can be equipped with wireless communication devices to send detection signals to the electronic controller 40.

Figure 6:
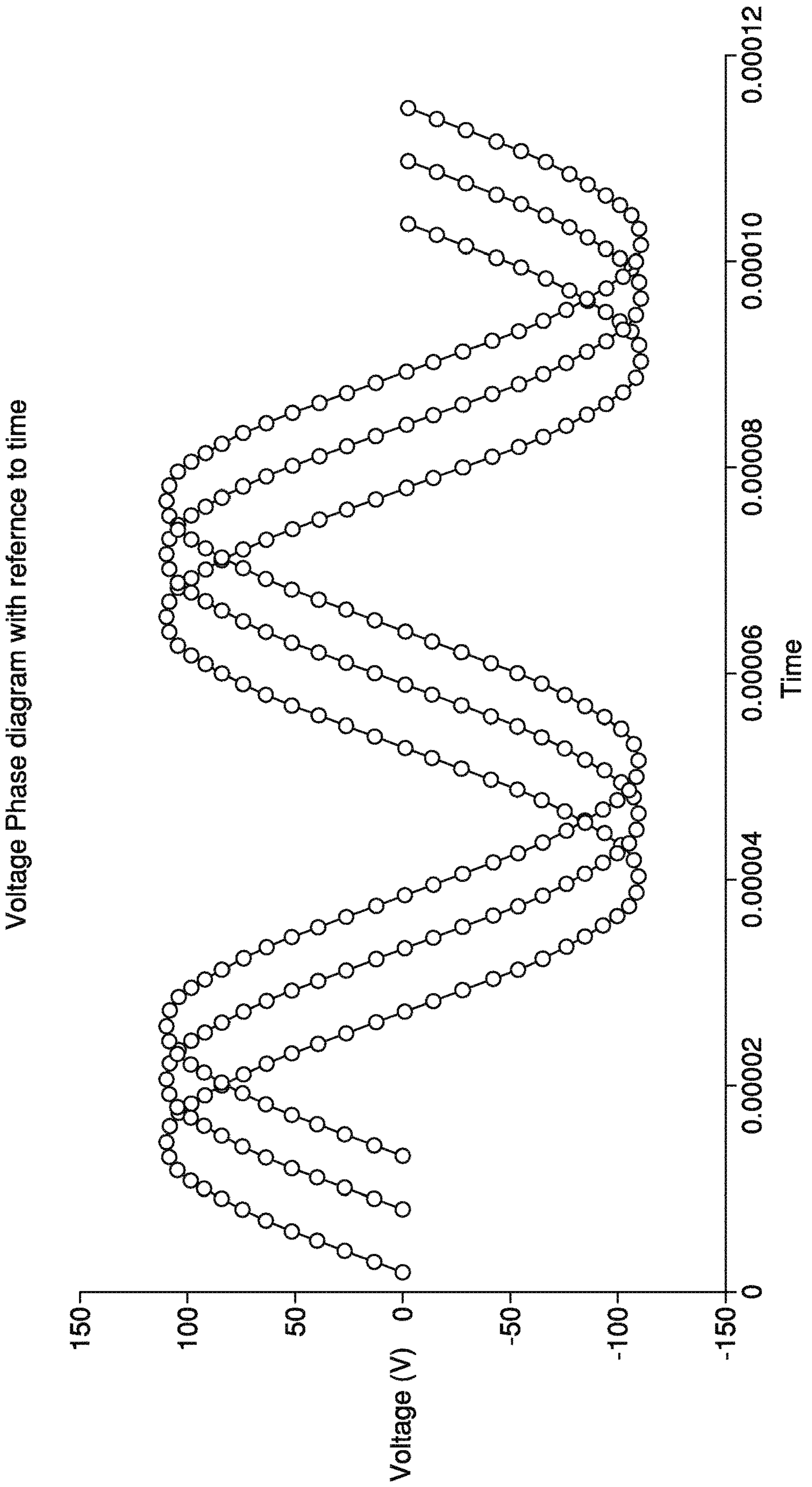
FIG. 6 is a graph of a voltage phase diagram illustrating an example of an electronic control of the voltage assisted painting system.

The memory 44 of the electronic controller 40 can store parameters for the frequencies emitted by the electrodes 16. The memory 44 can be programmed to set these parameters or programmed to pre-store these parameters. For example, the memory 44 can store ranges of modulation frequencies that correspond to detected size(s) of the droplets. For example, the electronic controller 40 can be programmed to control the electrodes 16 and 16A to increase electric field emission when the droplets are detected to be greater than a predetermined size to dislodge the droplets. The electronic controller 40 can also include a timer such that the electronic controller 40 is programmed to control the electrodes 16 to automatically emit pre-determined electric field intensity based on pre-set time periods. The electronic controller 40 can control the electrodes 16 and 16A in accordance with a voltage phase diagram as illustrated in FIG. 6.

Referring to FIGS. 1 and 2, the voltage assisted painting system 10 can further include an inspection system for quality insurance of the paint application. For example, the inspection includes one or more detectors, such as cameras 48, for detecting the paint that is dispensed from the outlets 24 of the housing 12. As shown, the cameras 48 are preferably disposed on a bottom side of the housing 12 in the vicinity of the outlets 24 of the housing 12. The cameras 48 can utilize thermal imaging or acoustic imaging to measure a size or profile of the droplets that are ejected from the outlets 24 of the housing 12. Additionally, as seen in FIG. 2, the cameras 48 are in electronic communication with the electronic controller 40 via wireless communication device(s). The electronic controller 40 can be programmed to measure a thickness or uniformity of the paint that is applied to the vehicle body based on the information detected by the cameras 48.

Figure 7:
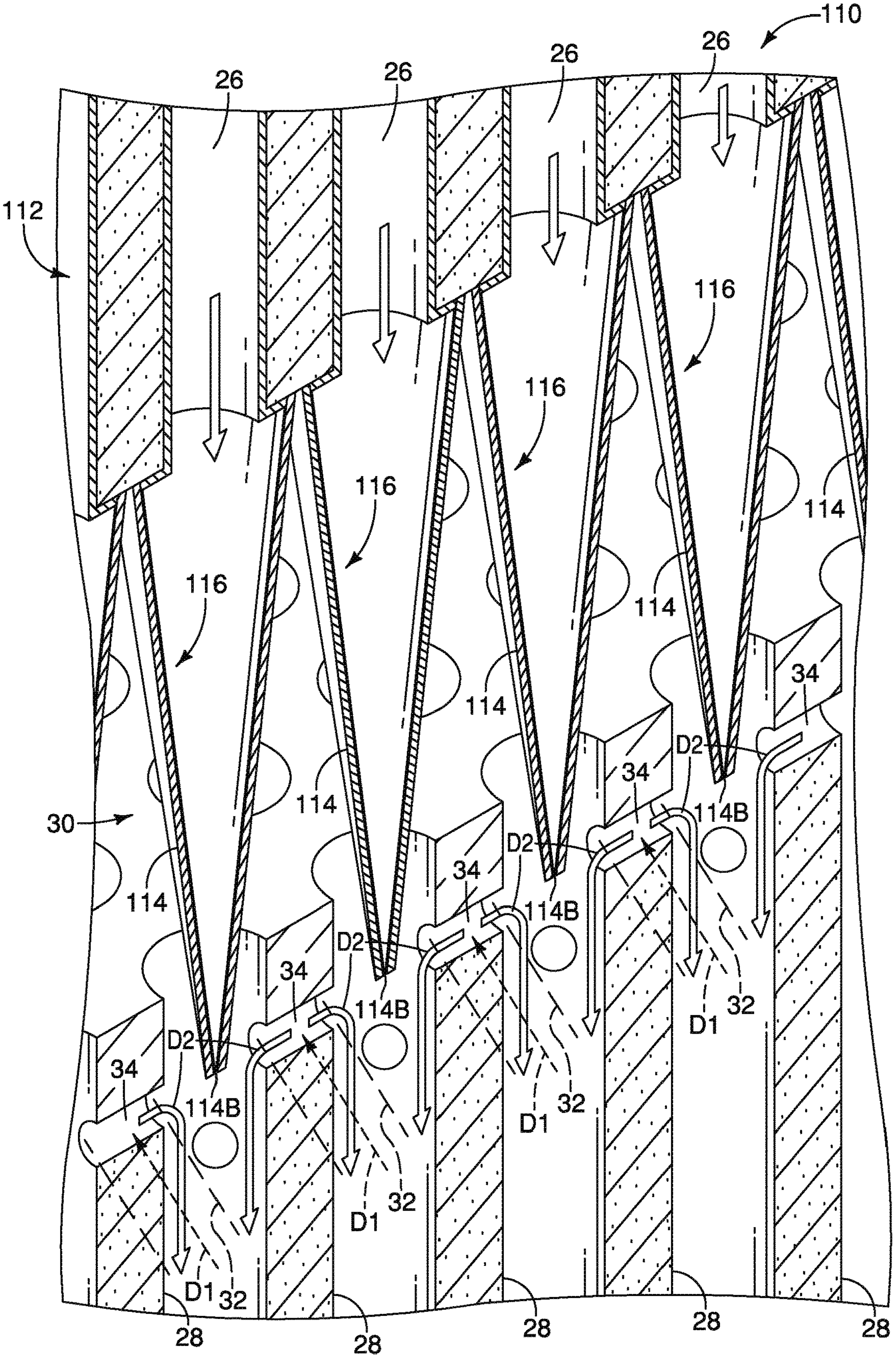
FIG. 7 is an enlarged cross-sectional view of a first modified voltage assisted painting system.

Referring now to FIG. 7, a first modified voltage assisted painting system 110 is illustrated. The first modified voltage assisted painting system 110 includes a housing 112 that is identical to the housing 12 of the voltage assisted panting system 10. Therefore, the housing 112 includes a reservoir for storing paint, a conduit that fluidly receives paint from an external source (not shown) to be stored in the reservoir, similar to that described in the voltage assisted painting system 10. In the illustrated embodiment, first modified voltage assisted painting system 110 also includes a plurality of nozzles 114 and one or more voltage regulators 18 that are identical to the voltage regulators 18 described in the voltage assisted painting system 10. As shown, the first modified voltage assisted painting system 110 is a multi-nozzle system for paint application.

Due to the similarities between the first modified voltage assisted painting system 110 and the voltage assisted painting system 10, identical components in the first modified voltage assisted painting system 110 will receive the same reference numerals as the voltage assisted painting system 10. Modified components of the first modified voltage assisted painting system 110 will receive the same reference numerals as corresponding components of the voltage assisted painting system 10 but increased by 100.

The first modified voltage assisted painting system 110 includes a plurality of nozzles 114 that are identical to the nozzles 14 of the voltage assisted painting system 10. The nozzles 114 are made of any conducting material capable of conducting electricity, such as copper. Preferably, the nozzles 114 are metallic bodies or tubes. Each metallic body has the at least one electrode 116. Thus, the nozzles 114 defines the electrodes 116 of the voltage assisted painting system 110. Alternatively speaking, each of the electrodes 116 of the voltage assisted painting system 110 is provided at each of the nozzles 114. In the illustrated embodiment, the housing 112 is preferably made of an electric insulating material such as ceramic. In the illustrated embodiment, the nozzles 114 can be considered the electrodes 116 that generate electric fields upon receiving voltage application, as will be further discussed below. The at least one electrode 116 is formed as part of the metallic body in the first modified voltage assisted painting system 110.

The first modified voltage assisted painting system 110 does not include the additional electrodes 16A at the outlets of the nozzles 114. The first modified voltage assisted painting system 110 also does not include the additional voltage regulators 18A. Therefore, in the first modified voltage assisted painting system 110, the electrodes 116 that provide electric charge to the paint is the nozzles 114 themselves.

With the first modified voltage assisted painting system 110, the voltage regulators (similar to the voltage regulators 18 of the voltage assisted painting system 10) can apply voltage to the nozzles 114 with a positive charge. The vehicle body (e.g., the substrate) has a negative charge. The application of paint using the first modified voltage assisted painting system 110 can use electrostatic forces utilized in electrostatic spray systems.

Referring now to FIGS. 8 to 11, a second modified voltage assisted painting system 210 is illustrated. The second modified voltage assisted painting system 210 includes a housing 112 that is identical to the housing 112 of the first modified voltage assisted panting system 110, and will not be further described herein. Due to the similarities between the second modified voltage assisted painting system 210 and the first modified voltage assisted painting system 110, identical components in the second modified voltage assisted painting system 210 will receive the same reference numerals as the first modified voltage assisted painting system 110. Modified components of the second modified voltage assisted painting system 210 will receive the same reference numerals as corresponding components of the first modified voltage assisted painting system 110 but increased by 100.

The second modified voltage assisted painting system 210 includes a plurality of second modified nozzles 214. The second modified nozzles 214 are made of any conducting material capable of conducting electricity, such as copper. Preferably, the second modified nozzles 214 are metallic bodies or tubes. The metallic tubes of the modified nozzles 214 are formed of different sections, as will be further described herein. In the illustrated embodiment, each metallic body has the at least one electrode 216. Thus, the second modified nozzle 214 define the electrodes 216 of the second modified voltage assisted painting system 210. Alternatively speaking, each of the electrodes 216 of the second modified voltage assisted painting system 210 is provided at each of the second modified nozzles 214. In the illustrated embodiment, the second modified nozzles 214 can be considered the electrodes 216 that generate electric fields upon receiving voltage application, as will be further discussed below. The at least one electrode 216 is formed as part of the metallic body in the second modified voltage assisted painting system 210.

Figure 8:
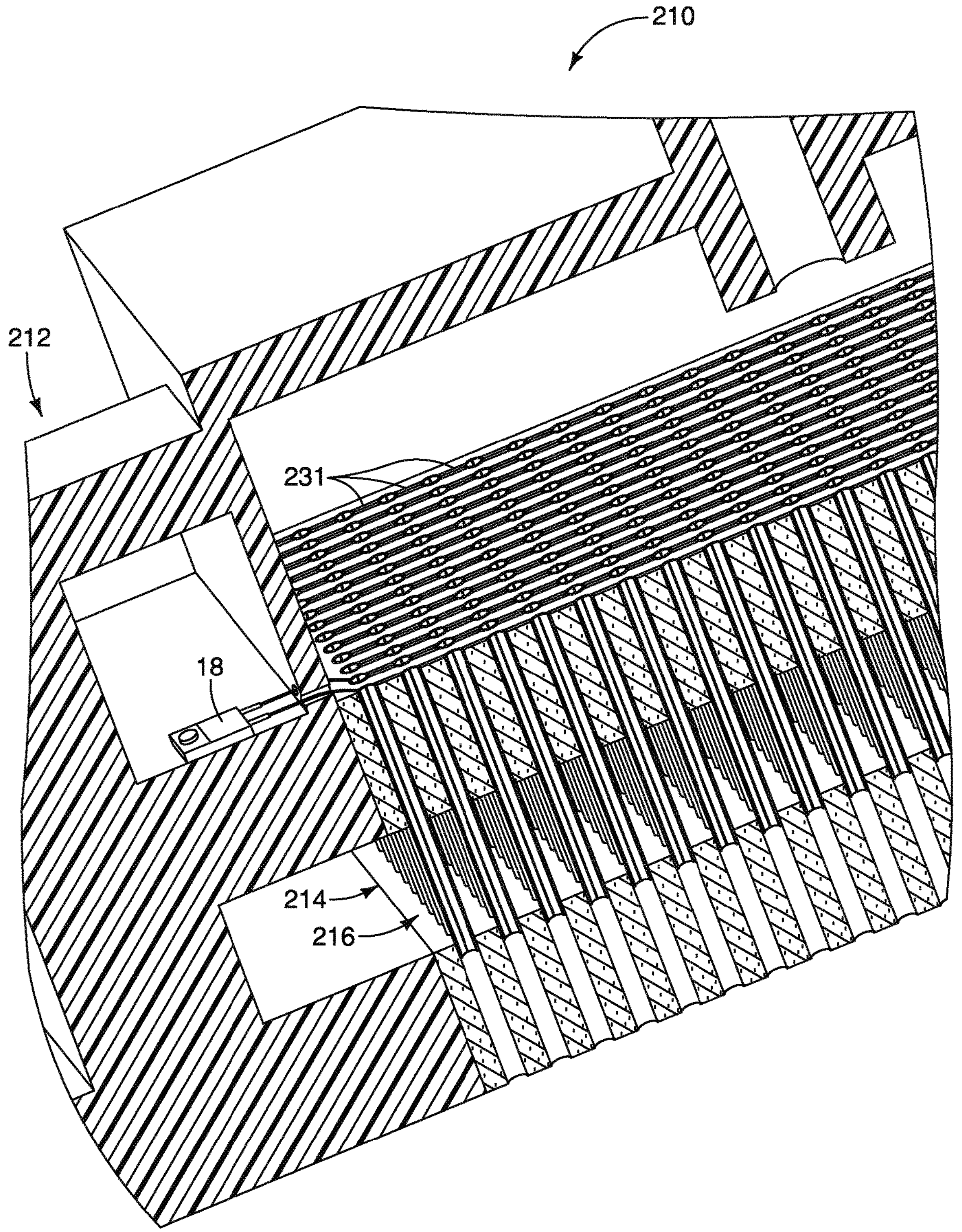
FIG. 8 is a cross-sectional view of a second modified voltage assisted painting system.
Figure 9:
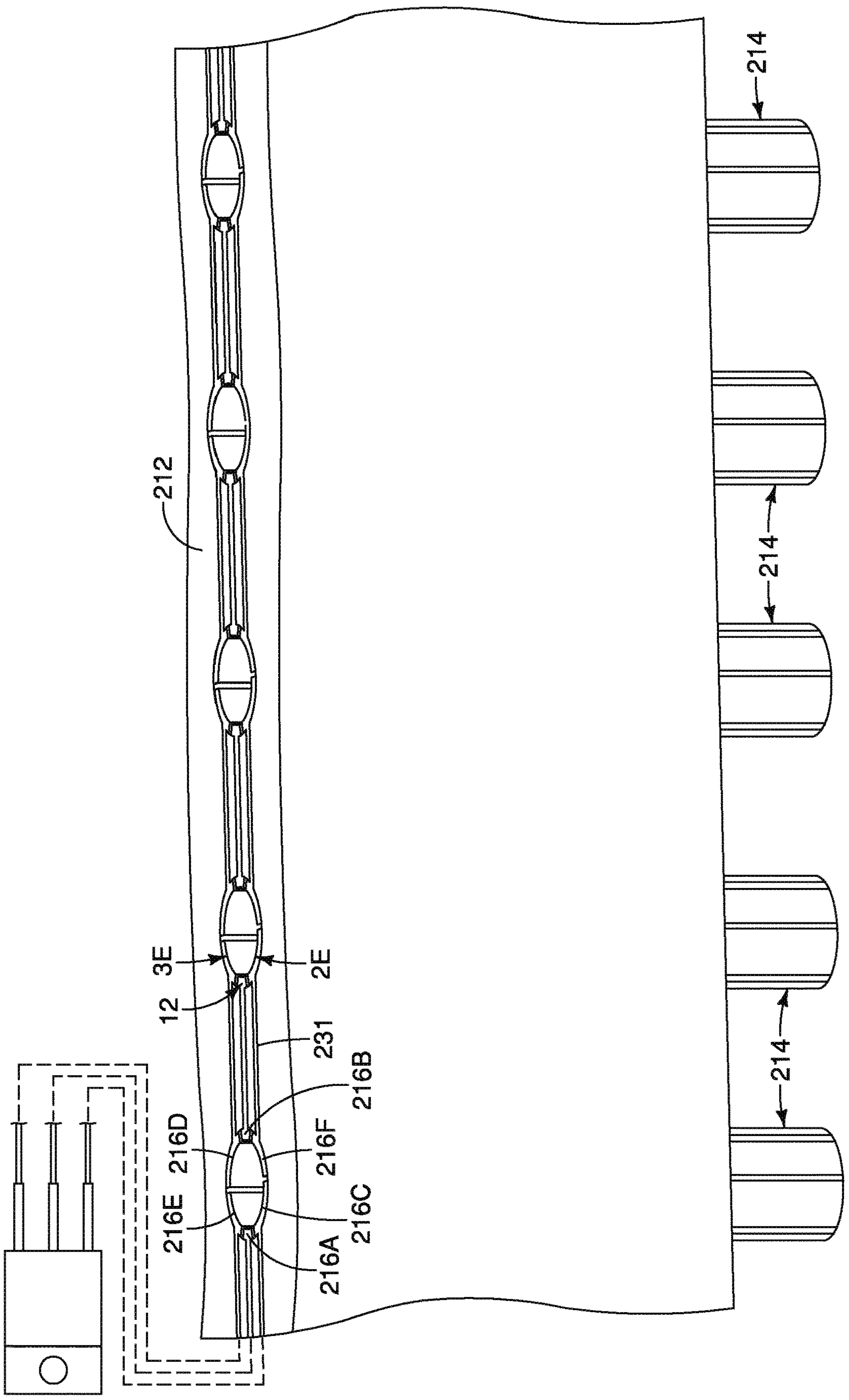
FIG. 9 is an enlarged partial perspective view of the second modified voltage assisted painting system.

As best seen in FIGS. 8 and 9, the second modified nozzles 214 are electrically connected together via electrical conductors 231 such as metallic bars or strips. The second modified nozzles 214 are electrically connected at the inlets of the second modified nozzles 214. The second modified voltage assisted painting system 210 can include one or more voltage regulators 18 that are identical to the voltage regulators 18 of the voltage assisted painting system 10 previously described. The voltage regulators 18 are electrically connected to one of the second modified nozzles 214 so that the electrical charge or voltage provided to the second modified nozzles 214 can be transmitted through all of the second modified nozzles 214 via the electrical conductors 231. The voltage regulators 18 can be connected to the second modified nozzles 214 via one or more electrical wires that are schematically shown. In the second modified voltage assisted painting system 210, the electrical conductors 231 can be formed as part of the electrodes 216, as will be further described.

Figure 10:
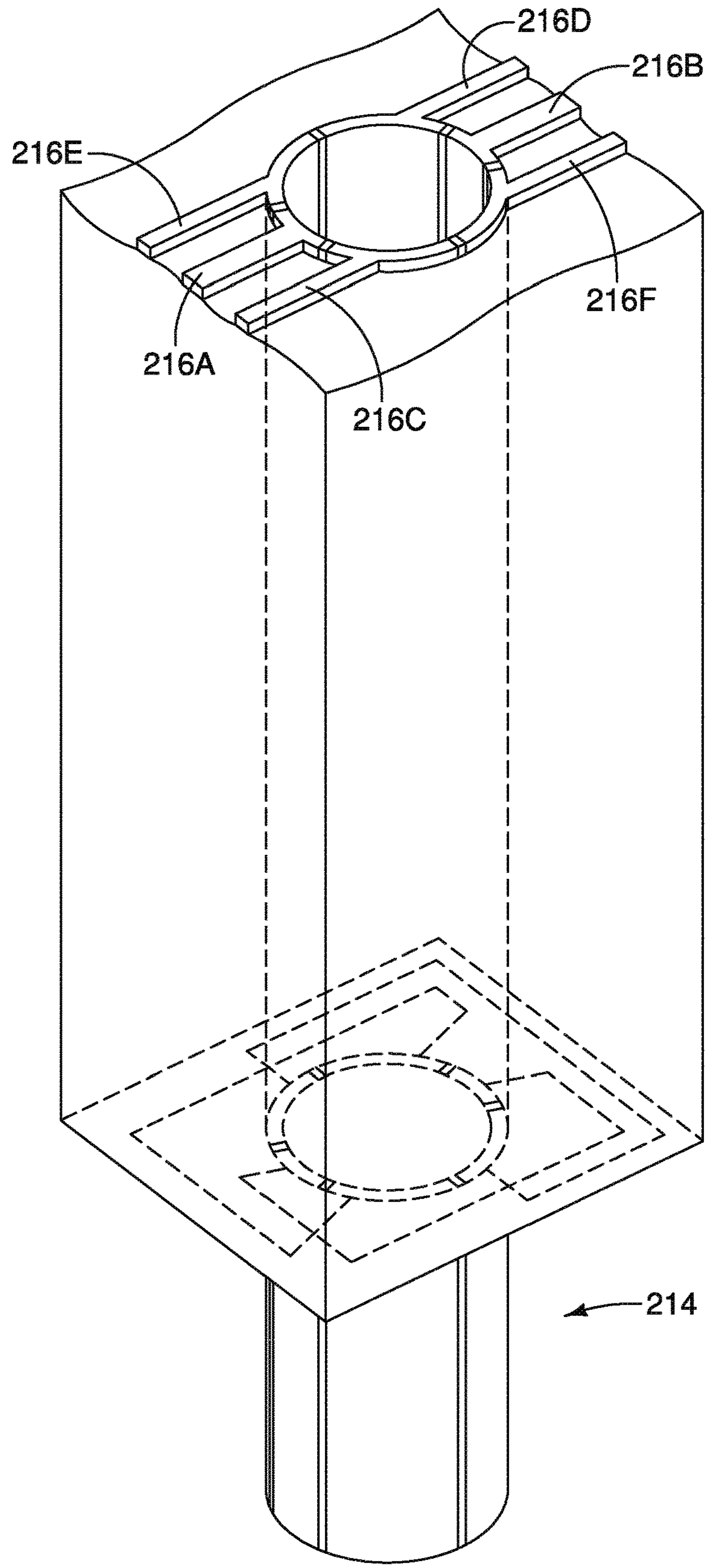
FIG. 10 is an enlarged partial perspective view of one of the nozzles of the second modified voltage assisted painting system.
Figure 11:
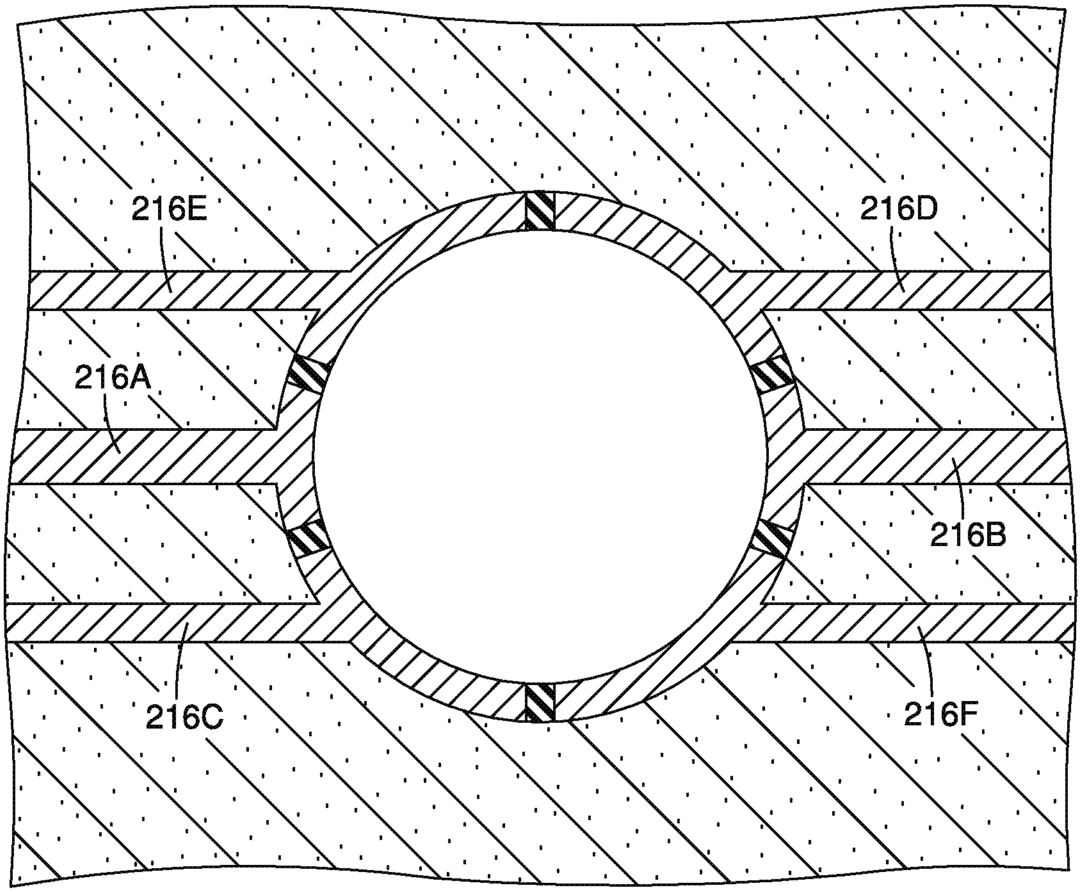
FIG. 11 is a cross-sectional view of the nozzle of FIG. 10

Referring now to FIGS. 9 to 11, the metallic bodies of the second modified nozzles 214 will now be discussed. As the second modified nozzles 214 are identical with respect to each other, only one of the second modified nozzles 214 will be further described herein for brevity. The metallic body includes a first section 216A and a second section 216B. The metallic body further includes a third section 216C and a fourth section 216D. The metallic body further includes a fifth section 216E and a sixth section 216F.

The first and second sections 216A and 216B are disposed on opposite sides of the second modified nozzle 214 with respect to each other. The third and fourth sections 216C and 216D are disposed on opposite sides of the second modified nozzle 214 with respect to each other. The fifth and sixth sections 216E and 216F are disposed on opposite sides of the second modified nozzle 214 with respect to each other. Each of the sections are separated from the next one of the sections by insulation 250 such as rubber.

As best seen in FIGS. 10 and 11, the first and second section 216B are electrically connected so that the first and second sections 216A and 216B together define a first electrode 1E of the metallic body. The third section 216C and fourth section 216D are electrically connected so that the third and fourth sections 216C and 216D together define a second electrode 2E of the metallic body. The fifth and sixth sections 216E and 216F are electrically connected so that the fifth and sixth sections 216E and 216F together define a third electrode 3E of the metallic body. Therefore, the second modified voltage assisted painting system 210 includes first, second and third electrodes 1E, 2E and 3E that are defined by the metallic bodies of the second modified nozzles 214.

The voltage regulator 18 can send voltage to the first, second and third electrodes 1E, 2E and 3E in a sequential pattern to charge the first, second and third electrodes 1E, 2E and 3E one at a time. The voltage regulator 18 can stagger the voltage application to the first, second and third electrodes 1E, 2E and 3E to create electric fields that will cause rotation of the droplet formation inside the metallic body. That is, the control of the first, second and third electrodes 1E, 2E and 3E creates a rotational magnetic field inside the body of the second modified nozzle 214. The voltage regulator 18 can be controlled by an electronic controller similar to the electronic controller described for the voltage assisted painting system.

While the second modified nozzles 214 of the second modified voltage assisted painting system 210 are illustrated as including first, second and third electrodes 1E, 2E and 3E each, it will be apparent to those skilled in the vehicle field from this disclosure that the number of electrodes similar to that described herein can vary depending as needed and/or desired. The electronic controller can be programmed to control multiple numbers of electrodes to generate electric fields that will cause rotation of the droplets formed inside the nozzles 214.

As best seen in FIG. 9, the first through sixth sections 1A to 1F are illustrated as forming the electrical conductors 231 that conduct voltages across the nozzles 214. That is, the second, fourth and sixth sections 216B, 216B and 216F of one of the nozzles 214 can extend down the housing to then define the first, third and fifth sections 216A, 216C and 216E of the next adjacent one of the nozzles 214. It will be apparent to those skilled in the vehicle field from this disclosure that the electrical conductors 231 can be provided separately from the electrodes 216 to transmit electric voltage from one nozzle 214 to the next.

Figure 12:
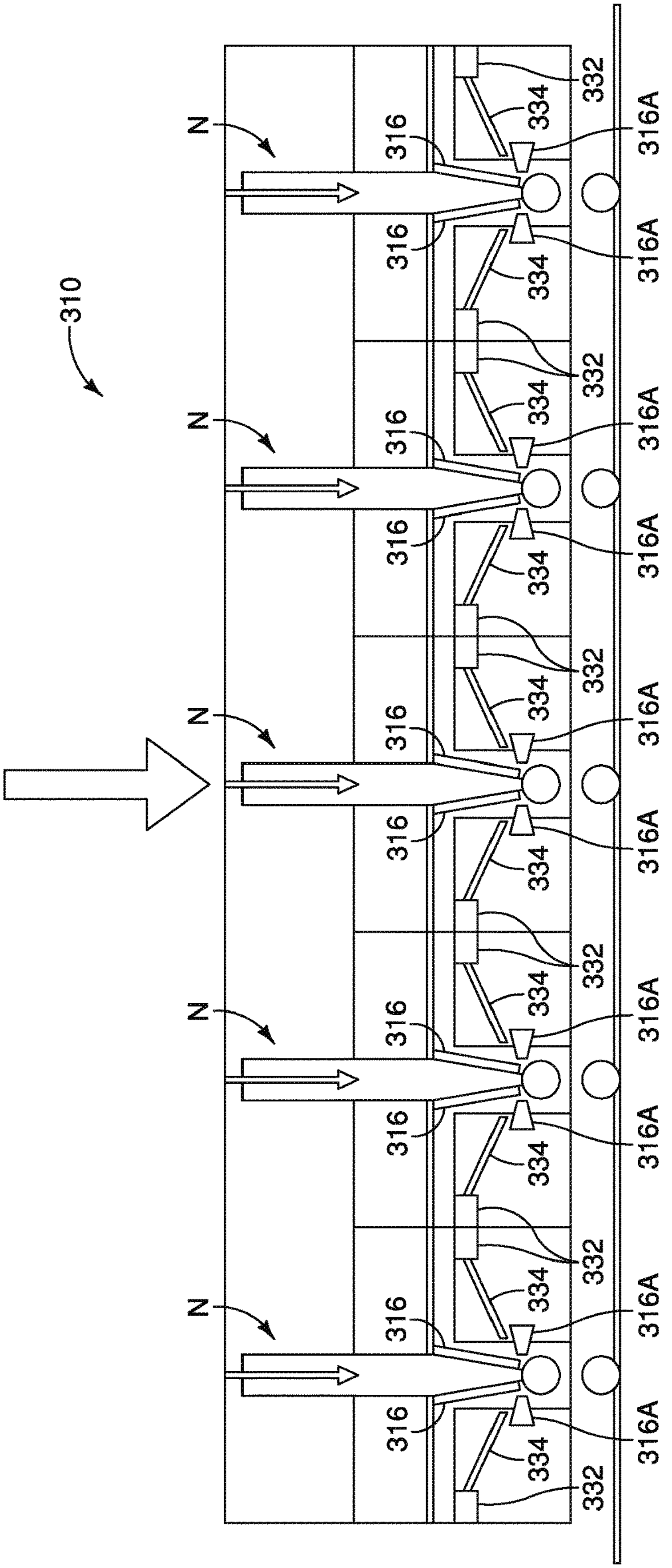
FIG. 12 is a schematic view of a first example of an array of nozzles that can be implemented with any of the voltage assisted painting systems of FIGS. 1 through 11.
Figure 13:
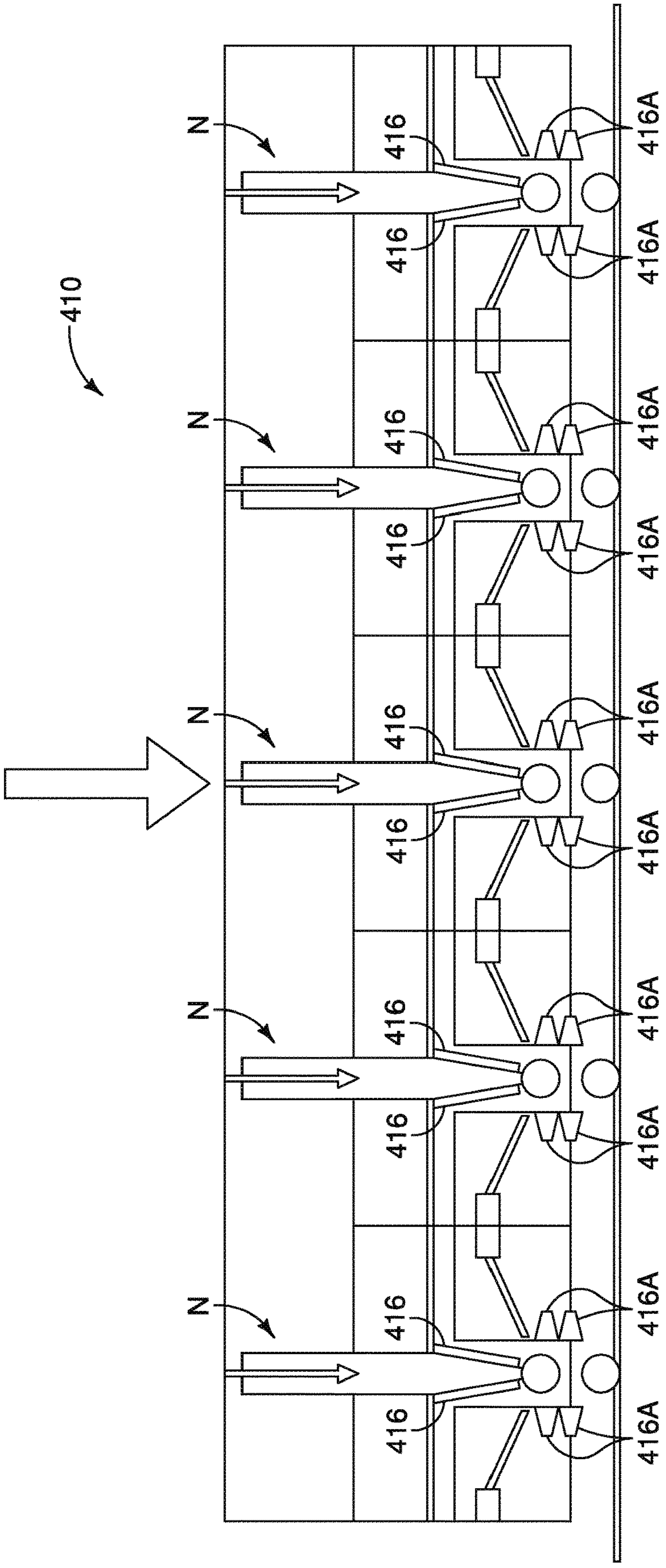
FIG. 13 is a schematic view of a second example of an array of nozzles that can be implemented with any of the voltage assisted painting systems of FIGS. 1 through 11.
Figure 14:
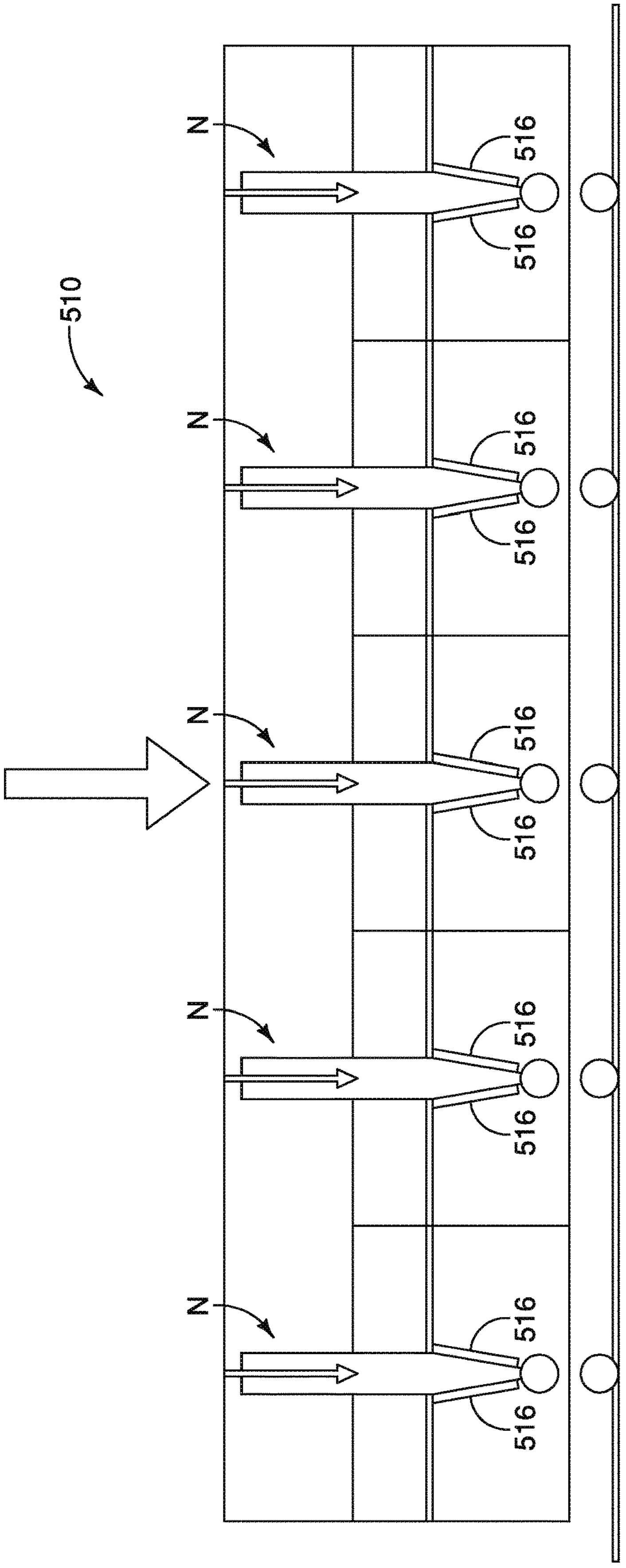
FIG. 14 is a schematic view of a third example of an array of nozzles that can be implemented with any of the voltage assisted painting systems of FIGS. 1 through 11.

Referring now to FIGS. 12 to 14, schematic examples arrays of nozzles N that can be implemented with any of the voltage assisted painting systems 10, 110 and 210 described in FIGS. 1 through 11 are illustrated. The nozzles N are arranged to receive electric voltage from one or more voltage regulators (not shown), as described previously. As seen in FIG. 12, a first array of nozzles 310 are provided as having first electrodes 316 provided on the nozzles N. As shown, the first electrodes 316 are provided along outlets of the nozzles N. The first electrodes 316 can be formed as part of the nozzles N as metallic bars or strips along the nozzles N. The first electrodes 316 can alternatively be provided onto the nozzles N as an additional component. As shown, the first array of nozzles 310 are also provided with second electrodes 316A provided near the outlets. The second electrodes can be similar in function and configuration to the additional electrodes 16A of the voltage assisted painting system.

As shown, the first array of nozzles 310 are also provided with modified first and second air flow channels 332 and 334. The modified first and second air flow channels 332 and 334 are similar in function to the first and second air flow channels 32 and 34 of the voltage assisted painting system 10. The only difference is that the second air flow channels 334 extend at an angle with respect to the first air flow channels 332 towards the outlets.

As seen in FIG. 13, a second array of nozzles 410 are provided as having first electrodes 416 provided on a plurality of nozzles N identically to the first electrodes of the first array of nozzles. As shown, the second array of nozzles 410 are also provided with second electrodes 416A provided near the outlets. The second electrodes 416A can be similar in function and configuration to the additional electrodes 16A of the voltage assisted painting system 10 and the second electrodes 416A provided with the first array of nozzles 310. The second electrodes 416A include a double row of electrodes arranged in a symmetrical array configuration around the outlets. It will be apparent to those skilled in the vehicle field from this disclosure that the second electrodes 416A provided near the outlets can include a varying plurality if rows of second electrodes 416A to help discharge the droplets from the outlets.

As seen in FIG. 14, a third array of nozzles 510 are provided as having first electrodes 516 provided on the nozzles N identical to the first electrodes 516 of the first array of nozzles 310. The third array of nozzles 510 are basically identical to the first array of nozzles 310, except the third array of nozzles 510 are not provided with second electrodes. Therefore, the third array of nozzles 510 are examples of a simplified array of nozzles. The third array of nozzles 510 can be provided for electrostatic spray techniques in which the nozzles N are charged to create an electric field with the substrate (e.g., a vehicle body).

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the voltage assisted painting system. Accordingly, these terms, as utilized to describe the present invention should be interpreted relative to a vehicle equipped with the voltage assisted painting system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An voltage assisted painting system comprising:

a housing having a conduit for receiving paint from an external source into the housing;

at least one nozzle disposed in the housing, the at least one nozzle having an inlet that is fluidly connected to the conduit to receive paint from the conduit, the at least one nozzle having an outlet that dispenses paint, the nozzle inlet being larger than the nozzle outlet, the inlet and the outlet being continuously connected by a sidewall of the nozzle tapering from the nozzle inlet to the nozzle outlet; and at least one first electrode provided at the housing at a location downstream of the inlet with respect to the conduit, the at least one first electrode being provided on the at least one nozzle or the at least one nozzle defining the at least one first electrode, the at least one first electrode being configured to generate a magnetic field in the vicinity of the outlet to induce droplet formation in the paint dispensed from the nozzle outlet.

2. The voltage assisted painting system according to claim 1, wherein at least one second electrode is provided adjacent to the at least one outlet of the at least one nozzle.

3. The voltage assisted painting system according to claim 2, wherein the at least one second electrode includes a plurality of electrodes that are arranged in a symmetrical array around the at least one outlet.

4. The voltage assisted painting system according to claim 1, wherein the at least one nozzle includes a metallic body capable of conducting electricity.

5. The voltage assisted painting system according to claim 4, wherein the metallic body has the at least one first electrode.

6. The voltage assisted painting system according to claim 5, wherein the at least one first electrode is formed as part of the metallic body.

7. The voltage assisted painting system according to claim 6, wherein the metallic body includes a first section and a second section that is electrically connected to the first section so that the first and second sections together define the first electrode of the metallic body.

8. The voltage assisted painting system according to claim 7, wherein the metallic body further includes a third section and a fourth section that is electrically connected to the third section so that the third and fourth sections together define a second electrode of the metallic body.

9. The voltage assisted painting system according to claim 8, wherein the metallic body further includes a fifth section and a sixth section that is electrically connected to the fifth section so that the fifth and sixth sections together define a third electrode of the metallic body.

10. The voltage assisted painting system according to claim 9, wherein the first and second sections are disposed on opposite sides of the nozzle with respect to each other, the third and fourth sections are disposed on opposite sides of the nozzle with respect to each other, and the fifth and sixth sections are disposed on opposite sides of the nozzle with respect to each other.

11. The voltage assisted painting system according to claim 1, wherein the at least one nozzle includes a plurality of nozzles, each of the plurality of nozzles having a respective inlet that is fluidly connected to the conduit that receives paint.

12. The voltage assisted painting system according to claim 11, wherein the plurality of nozzles are arranged in an array of successive rows and columns within the housing.

13. The voltage assisted painting system according to claim 12, wherein the plurality of nozzles are made of metallic material capable of conducting electricity.

14. The voltage assisted painting system according to claim 13, wherein each of the plurality of nozzles are in electric communication with each other.

15. The voltage assisted painting system according to claim 14, further comprising a voltage regulator that is electrically connected to each of the plurality of nozzles to regulate electric current to the nozzles.

16. The voltage assisted painting system according to claim 11, wherein the housing includes a paint reservoir that receives paint from the conduit.

17. The voltage assisted painting system according to claim 16, wherein the housing includes a first airflow channel extending through the plurality of channels in a first direction to enable external air to flow through the plurality of channels in the first direction.

18. The voltage assisted painting system according to claim 17, wherein the housing includes a second airflow channel extending through the plurality of channels in a second direction that is transverse to the first direction to enable external air to flow in the second direction.

* * * * *